United States Patent
Tiefenau et al.

(10) Patent No.: US 10,542,354 B2
(45) Date of Patent: Jan. 21, 2020

(54) HEARING DEVICE WITH SUPPRESSION OF COMB FILTERING EFFECT

(71) Applicant: GN Hearing A/S, Ballerup (DK)

(72) Inventors: Andreas Tiefenau, Gammel Holte (DK); Jonathan Boley, Mundelein, IL (US); Changxue Ma, Barrington, IL (US)

(73) Assignee: GN Hearing A/S, Ballerup (DK)

( * ) Notice: Subject to any disclaimer, the term of this patent is extended or adjusted under 35 U.S.C. 154(b) by 208 days.

(21) Appl. No.: 15/631,726

(22) Filed: Jun. 23, 2017

(65) Prior Publication Data

US 2018/0376258 A1  Dec. 27, 2018

(51) Int. Cl.
  *H04R 25/00* (2006.01)
  *H04B 15/04* (2006.01)

(52) U.S. Cl.
  CPC .......... H04R 25/505 (2013.01); H04B 15/04 (2013.01); H04R 25/453 (2013.01); *H04R 2225/49* (2013.01); *H04R 2460/01* (2013.01)

(58) Field of Classification Search
  CPC ..... H04R 25/505; H04R 25/453; H04B 15/04
  See application file for complete search history.

(56) References Cited

U.S. PATENT DOCUMENTS

| | | | |
|---|---|---|---|
| 5,621,802 A * | 4/1997 | Harjani | H04R 25/453 381/312 |
| 6,307,944 B1 * | 10/2001 | Garratt | H04R 25/50 381/312 |
| 9,392,366 B1 | 7/2016 | Meyer et al. | |
| 2009/0041260 A1 * | 2/2009 | Jorgensen | G10K 11/178 381/71.6 |
| 2014/0050340 A1 | 2/2014 | Meyer et al. | |
| 2014/0301583 A1 * | 10/2014 | Herscher | H04R 25/554 381/315 |
| 2017/0366903 A1 * | 12/2017 | Meyer | H04R 25/70 |

FOREIGN PATENT DOCUMENTS

| | | |
|---|---|---|
| EP | 2023664 A1 | 2/2009 |
| JP | 2000/102098 | 4/2000 |
| WO | WO 2009/010095 | 1/2009 |

OTHER PUBLICATIONS

English translation Abstract for related Japanese application JP 10267575.
Extended European Search Report (EESR) dated Oct. 17, 2018 for corresponding EP Application No. 18169403.5.

* cited by examiner

*Primary Examiner* — Simon King
(74) *Attorney, Agent, or Firm* — Vista IP Law Group, LLP

(57) ABSTRACT

A hearing device includes: an input module for provision of a first input signal, the input module comprising a first microphone; a processor for provision of a processor output signal based on the first input signal; a suppressor for provision of a first suppressor output signal based on one or more suppressor input signals including a first suppressor input signal; a first adder coupled to the suppressor, the first adder configured for provision of a first adder output signal based on at least a part of the processor output signal and the first suppressor output signal; and a receiver for converting an output signal based on the first adder output signal to an audio output signal; wherein the suppressor is configured to apply a first delay and a first filter with a first gain to at least a part of the first suppressor input signal.

36 Claims, 11 Drawing Sheets

HEARING DEVICE WITH SUPPRESSION OF COMB FILTERING EFFECT

The present disclosure relates to a hearing device with suppression of comb filtering effect and related method. In particular, a method of operating a hearing device is disclosed.

BACKGROUND

Hearing devices, and in particular hearing devices with open fittings generally suffer from the so-called comb filter effects. On the other hand, forming a perfect sealing of the ear canal leads to highly unpleasant occlusion effects.

SUMMARY

Accordingly, there is a need for devices and methods overcoming or at least reducing the comb filtering effect.

Thus, a hearing device is provided, the hearing device comprising an input module for provision of a first input signal, the input module comprising a first microphone; a processor for processing the first input signal and provision of a processor output signal based on the first input signal; a comb suppressor for provision of a first suppressor output signal based on one or more suppressor input signals including a first suppressor input signal; a first adder connected to the comb suppressor, the first adder configured for provision of a first adder output signal based on at least a part of the processor output signal and the first suppressor output signal; and a receiver for converting an output signal based on the first adder output signal to an audio output signal. The comb suppressor may be configured to apply a first delay and a first filter with a first gain to at least a part of the first suppressor input signal.

Also disclosed is a method of operating a hearing device comprising an input module and a processor, the method comprising converting an audio input to a first input signal; providing a processor output signal, e.g. based on the first input signal; and providing a first suppressor output signal, e.g. based on one or more suppressor input signals including a first suppressor input signal. Providing a first suppressor output signal optionally comprises applying a first delay and/or a first filter with a first gain to at least a part of the first suppressor input signal. The method comprises providing a first adder output signal based on at least a part of the processor output signal and the first suppressor output signal; and converting an output signal based on the first adder output signal to an audio signal.

The present devices and methods provide improved suppression of the comb filtering effect in a hearing device. Thus, the listening experience for hearing device users is improved.

A hearing device includes: an input module for provision of a first input signal, the input module comprising a first microphone; a processor for provision of a processor output signal based on the first input signal; a suppressor for provision of a first suppressor output signal based on one or more suppressor input signals including a first suppressor input signal; a first adder coupled to the suppressor, the first adder configured for provision of a first adder output signal based on at least a part of the processor output signal and the first suppressor output signal; and a receiver for converting an output signal based on the first adder output signal to an audio output signal; wherein the suppressor is configured to apply a first delay and a first filter with a first gain to at least a part of the first suppressor input signal.

Optionally, the suppressor comprises a comb suppressor.

Optionally, the suppressor comprises a primary suppressor part, the primary suppressor part having a first primary input connected to the input module for receiving the first suppressor input signal, the primary suppressor part configured to apply a first primary delay as the first delay and a first primary gain as the first gain to at least a part of the first suppressor input signal to form a first primary output signal, wherein the first primary output signal forms at least a part of the first suppressor output signal.

Optionally, the suppressor comprises a primary suppressor part, the primary suppressor part having a first primary input connected to the processor for receiving the first suppressor input signal, the primary suppressor part configured to apply a first primary delay as the first delay and a first primary gain as the first gain to at least a part of the first suppressor input signal to form a first primary output signal, wherein the first primary output signal forms at least a part of the first suppressor output signal.

Optionally, the suppressor comprises a primary suppressor part, the primary suppressor part having a first primary input connected to an output of the first adder for receiving the first adder output signal as the first suppressor input signal, the primary suppressor part configured to apply a first primary delay as the first delay and a first primary gain as the first gain to at least a part of the first suppressor input signal to form a first primary output signal, wherein the first primary output signal forms at least a part of the first suppressor output signal.

Optionally, the suppressor comprises a suppressor controller configured to control the first delay and the first filter.

Optionally, the suppressor comprises a suppressor controller, and wherein the suppressor controller is configured to control the primary suppressor part based on the first input signal.

Optionally, the suppressor controller is configured to control the first delay and the first filter.

Optionally, the input module comprises an ear canal microphone for provision of an ear canal input signal, and wherein the suppressor controller is configured to control the first delay and the first filter based on a second input signal from the input module, the ear canal input signal being the second input signal.

Optionally, the suppressor controller is configured to control the first delay and the first filter based on a control signal from the processor.

Optionally, the suppressor comprises a suppressor controller, and wherein the suppressor controller is configured to determine a suppressor mode and apply a first suppressor scheme if the suppressor mode is a first suppressor mode and a second suppressor scheme if the suppressor mode is a second suppressor mode.

Optionally, the primary suppressor part is configured to apply a second primary delay and a second primary filter to at least a part of the first suppressor input signal to form a second primary output signal, wherein the second primary output signal forms at least a part of the first suppressor output signal.

Optionally, the input module comprises a second microphone and a first beamformer, wherein the first beamformer is connected to the first microphone and the second microphone and is configured to provide a beamform signal based on first and second microphone signals as the first input signal.

Optionally, the hearing device comprises a filter bank and a second adder, the filter bank connected to the processor for filtering the processor output signal into at least a first filter output signal and a second filter output signal; wherein the first adder is configured to receive the first filter output signal, and the second adder is configured to receive the second filter output signal and the first adder output signal; and wherein the second adder is coupled to the receiver for provision of a second adder output signal to the receiver.

A method of operating a hearing device comprising an input module and a processor, the method includes: converting an audio input to a first input signal; providing a processor output signal based on the first input signal; providing a first suppressor output signal based on one or more suppressor input signals including a first suppressor input signal, wherein the act of providing the first suppressor output signal comprises applying a first delay and a first filter with a first gain to at least a part of the first suppressor input signal; providing a first adder output signal based on at least a part of the processor output signal and the first suppressor output signal; and converting an output signal based on the first adder output signal to an audio signal.

Optionally, the first suppressor input signal comprises, or is based on, the first input signal, the first adder output signal, or the processor output signal.

Optionally, the method further includes controlling the first delay and the first filter based on an input signal from the input module and/or a control signal from the processor.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
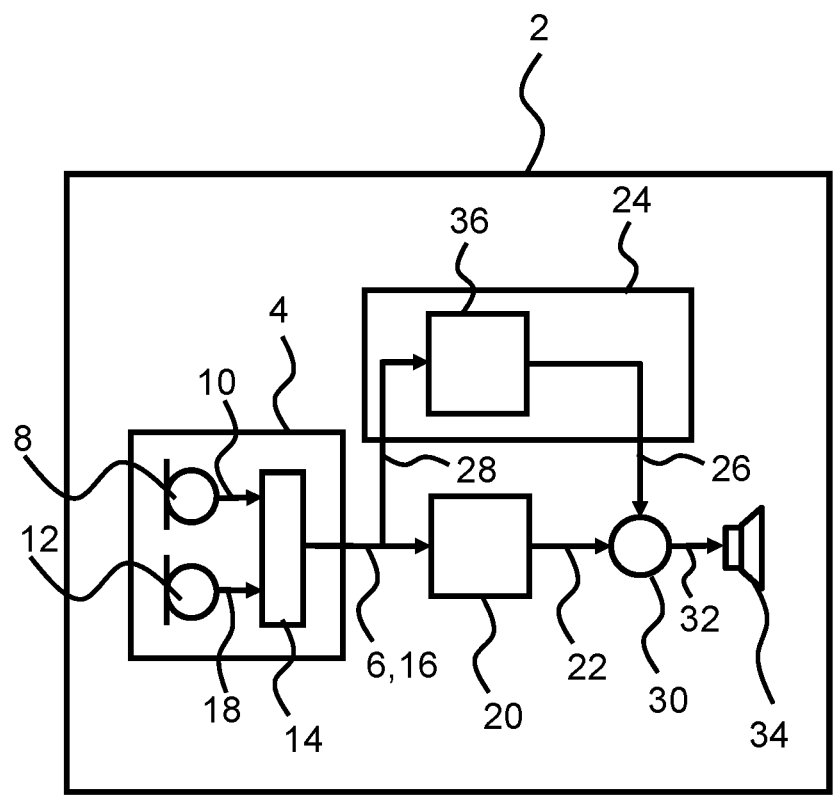
FIG. 1 schematically illustrates an exemplary hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. The processor may be configured to compensate for hearing loss of a user. The hearing aid may be a binaural hearing aid.

The hearing device may be a hearable. A hearable may be defined as anything that anything that fits in or on an ear that contains a wireless link, whether that's for audio, or remote control of audio augmentation.

The hearing device comprises an input module for provision of a first input signal. The input module comprises a first microphone for provision of a first microphone signal. The first microphone signal may be the first input signal. The input module may comprise a second microphone for provision of a second microphone signal. The input module may comprise a first beamformer for provision of a beamform signal. The first beamformer may be connected to the first microphone and the second microphone and configured to provide a beamform signal based on the first microphone signal and the second microphone signal. The beamform signal from the first beamformer may be the first input signal. Thus, the input module optionally comprises a second microphone and a first beamformer, wherein the first beamformer is connected to the first microphone and the second microphone and configured to provide a beamform signal based on first and second microphone signals as the first input signal.

The input module may comprise an ear canal microphone for provision of an ear canal microphone signal.

The hearing device comprises a processor for processing the first input signal and provision of a processor output signal based on the first input signal.

The hearing device comprises a comb suppressor for provision of a first suppressor output signal based on one or more suppressor input signals including a first suppressor input signal and/or a second suppressor input signal. The comb suppressor is optionally configured to apply a first delay to at least a part of the first suppressor input signal. The comb suppressor is optionally configured to apply a first filter, e.g. with a first gain, to at least a part of the first suppressor input signal. In one or more exemplary hearing devices, the comb suppressor is configured to apply a first delay and/or a first filter with a first gain to at least a part of the first suppressor input signal. The first delay of the comb suppressor is also denoted $d\_1$ and the first gain of the comb suppressor is also denoted $g\_1$. In one or more exemplary hearing devices, the first gain $d\_1$ may be set to $-1$. The first gain may be in the range from $-1$ to $-0.5$.

The hearing device comprises a first adder connected to the comb suppressor. The first adder is optionally configured for provision of a first adder output signal based on at least a part of the processor output signal and/or the first suppressor output signal.

The hearing device comprises a receiver for converting an output signal to an audio output signal. The output signal may be based on an adder output, such as the first adder output signal and/or a second adder output signal.

In one or more exemplary hearing devices, the comb suppressor optionally comprises a primary suppressor part.

The primary suppressor part may have a first primary input connected to the input module for receiving the first suppressor input signal. Thus, the first input signal from the input module may be used as the first suppressor input signal. The primary suppressor part may be configured to apply a first primary delay as the first delay and a first primary gain as the first gain to at least a part of the first suppressor input signal to form a first primary output signal based on the first suppressor input signal. The first primary output signal forms at least a part of the first suppressor output signal.

The first delay may, e.g. with the first input signal as the first suppressor input signal, be about twice the delay in the processor. Thus, the first delay may be in the range from 8 ms to 20 ms.

The primary suppressor part may have a first primary input connected to the processor for receiving the first suppressor input signal. Thus, the processor output signal may be used as the first suppressor input signal. The primary suppressor part may be configured to apply a first primary delay as the first delay and a first primary gain as the first gain to at least a part of the first suppressor input signal to form a first primary output signal based on the first suppressor input signal, wherein the first primary output signal forms at least a part of the first suppressor output signal.

The first delay may, e.g. with the processor output signal as the first suppressor input signal, be about the same as the delay in the processor. Thus, the first delay may be in the range from 4 ms to 10 ms.

The primary suppressor part may have a first primary input connected to an output of the first adder for receiving the first adder output signal as the first suppressor input signal. The primary suppressor part may be configured to apply a first primary delay as the first delay and a first primary gain as the first gain to at least a part of the first suppressor input signal to form a first primary output signal based on the first suppressor input, wherein the first primary output signal forms at least a part of the first suppressor output signal.

The comb suppressor may comprise a suppressor controller configured to control the first delay and/or the first filter, e.g. based on one or more controller input signals. The suppressor controller may be configured to control the primary suppressor part based on the first input signal, i.e. the first input signal from the input module may be used as a controller input signal to the suppressor controller.

In general, the suppressor controller may be configured to control the first delay and/or the first filter based on an input signal, such as the first input signal and/or a second input signal, from the input module, i.e. one or more input signals from the input module may be used as a controller input signal to the suppressor controller.

As noted above, the input module may comprise an ear canal microphone for provision of an ear canal input signal. The suppressor controller may be configured to control the first delay and/or the first filter based on a second input signal from the input module, the ear canal input signal being the second input signal. Thus, an ear canal input signal from the ear canal microphone may be used as a controller input signal to the suppressor controller.

The suppressor controller may be configured to detect presence of the user's own voice, e.g. based on the second input signal, and upon detection of presence of the user's own voice, deactivate comb suppression (e.g. second suppressor mode).

The suppressor controller may be configured to detect absence of the user's own voice, e.g. based on the second input signal.

The suppressor controller may be configured to control the first delay and/or the first filter based on a control signal from the processor, i.e. a control signal from the processor may be used as a controller input signal to the suppressor controller. The control signal from the processor may be indicative of one or more processor gains applied in the processor. The control signal may comprise a gain parameter based on one or more processor gains $G\_1, G\_2, \ldots, G\_N$ applied in the processor. The gain parameter may be a function of processor gains or a subset of processor gains. For example, the gain parameter may be a maximum value of processor gains or a mean value of processor gains. The suppressor controller enables power-efficient comb suppression, e.g. by allowing the hearing device to switch off comb suppression when not needed, e.g. when the processor gain(s) is/are large enough to shout down the comb filtering effect.

The suppressor controller may be configured to determine the first delay, e.g. based on one or more controller input signals, such as one or more input signals from the input module and/or a control signal from the processor. The processor output signal may be used as/form a controller input signal.

The suppressor controller may be configured to determine the first filter, e.g. the first gain, e.g. based on one or more controller input signals, such as one or more input signals from the input module and/or a control signal from the processor. The processor output signal may be used as/form a controller input signal.

The first gain $g\_1$ may be the same or substantially the same ($\pm 10\%$) as the gain of the acoustic path, e.g. in the range from 0.5 to 1.0.

The first gain $g\_1$ may be the same or substantially the same ($\pm 10\%$) as the difference between the acoustic path and the hearing device path, i.e. $g\_1 = g\_acoustic - G_{hearing\ device}$. For example, if the hearing device is set to (operates with) a +20 dB gain and the acoustic path provides −6 dB gain, $g\_1$ should be −26 dB.

The first gain $g\_1$ of the comb suppressor may be given as:

$$g\_1 = \frac{-G + \sqrt{G^2 + 4}}{2},$$

where G is the gain of the hearing device or a function of one or more hearing device gains $G\_1, G\_2, \ldots$.

The first delay $d\_1$ may correspond or be equal to twice the delay in the hearing device. For example, the first delay $d\_1$ may be in the range from $1.8 * d\_HD$ to $2.2 * d\_HD$, where $d\_HD$ is the delay in the hearing device.

The first delay $d\_1$ corresponds or is equal to the delay in the hearing device. For example, the first delay $d\_1$ may be in the range from $0.8 * d\_HD$ to $1.2 * d\_HD$, where $d\_HD$ is the delay in the hearing device.

The delay in the hearing device comprises hardware delays, e.g. from transducers and D/A converters, and delays related to the hearing device processing.

The suppressor controller may be configured to determine a suppressor mode and apply a first suppressor scheme if the suppressor mode is a first suppressor mode. The suppressor controller may be configured to apply a second suppressor scheme if the suppressor mode is a second suppressor mode.

The second suppressor scheme is different from the first suppressor scheme. A suppressor scheme may define delay(s) and/or gain(s)/filter coefficient(s) used in the comb suppressor. A suppressor mode, such as the second suppressor mode may be a non-suppression mode, i.e. no first suppressor output signal is fed to the first adder and/or the first suppressor output signal is zero. In other words, the suppressor controller may deactivate comb suppression, e.g. if a processor gain criterion is fulfilled for a second suppressor mode. The processor gain criterion may be based on one or more processor gains of the processor. For example, the processor gain criterion may be fulfilled (second suppressor mode) if a first processor gain, also denoted G_1, of the processor is larger than a first processor threshold.

The suppressor controller may deactivate comb suppression, e.g. if an input signal criterion is fulfilled for a second suppressor mode. The input signal criterion may be based on one or more input signals from the input module, such as the first input signal and/or the second input signal. The input signal criterion may be fulfilled if the power of the first input signal and/or the second input signal is larger than a first power threshold.

The hearing device may comprise an environment detector, the environment detector providing an output signal indicative of the environment. The output signal from the environment detector may be used as a controller input signal to the suppressor controller.

The primary suppressor part may be configured to apply a second primary delay and/or a second primary filter with second primary gain to at least a part of the first suppressor input signal to form a second primary output signal based on the first suppressor input signal. The second primary output signal may form at least a part of the first suppressor output signal. For example, the primary suppressor part may comprise a suppressor adder for adding primary output signals to form the first suppressor output signal. The primary suppressor part may comprise a low-pass filter for low-pass filtering the first suppressor input signal.

The primary suppressor part may comprise one or more delay units respectively connected to one or more gain units. The respective delay unit(s) may apply a primary delay to at least a part of the first suppressor input signal. The respective gain unit(s) may apply primary gain(s)/primary filter(s) to the delayed first suppressor input signal from the respective delay unit(s).

The primary suppressor part may comprise a first delay unit and a first gain unit. The first delay unit may apply a first primary delay (first delay) to at least a part of the first suppressor input signal, such as a low-pass, high-pass, or a band-pass part of the first suppressor input signal. Subsequently, the first gain unit may apply a first primary gain/first primary filter (first gain) to the delayed first suppressor input signal from the first delay unit. The output of the first gain unit forms a first primary output signal. The first primary output signal may form the first suppressor output signal. The first delay unit/first delay and/or the first gain unit/first gain are optionally controlled by a control signal from the suppressor controller. The first delay unit may be arranged after the first gain unit, i.e. the output of the first gain unit may be fed to the input of the first delay unit.

The primary suppressor part may comprise a second delay unit and a second gain unit. The second delay unit may apply a second primary delay (second delay) to at least a part of the first suppressor input signal, such as a low-pass, high-pass, or a band-pass part of the first suppressor input signal. Subsequently, the second gain unit may apply a second primary gain/second primary filter (second gain) to the delayed first suppressor input signal from the second delay unit. The output of the second gain unit forms a second primary output signal. The second delay unit/second delay and/or the second gain unit/second gain are optionally controlled by a control signal from the suppressor controller. The second delay unit may be arranged after the second gain unit, i.e. the output of the second gain unit may be fed to the input of the second delay unit.

The primary suppressor part may comprise a suppressor adder. The first primary output signal and the second primary output signal may be added or otherwise mixed in the suppressor adder to form the first suppressor output signal. It is to be understood that any suitable number of delay units/gain units may be implemented in the primary processor part. Multiple delay unit/gain unit pairs allow for a frequency dependent comb suppression. The second delay unit/second delay and/or the second gain unit/second gain are optionally controlled by a control signal from the suppressor controller.

The hearing device may comprise a filter bank and a second adder. The filter bank may be connected to the processor for filtering the processor output signal into at least a first filter output signal and a second filter output signal. The first filter output signal may be fed to the first adder and the second filter output signal may be fed to the second adder together with the first adder output signal. The second adder may be connected to the receiver for provision of a second adder output signal to the receiver. Thereby, the comb suppressor can operate on selected frequencies or frequency band(s). The first filter output signal may be a low-pass signal, e.g. with a cutoff frequency in the range from 500 Hz to 1500 Hz. The second filter output signal may be a high-pass signal, e.g. with a cutoff frequency equal to the cutoff frequency of the low pass filter.

In the method of operating a hearing device, the hearing device may be a hearing device as described herein.

In the method, converting an audio input to a first input signal may comprise converting an audio input to a first microphone signal and a second microphone signal and forming a beamform signal based on the first microphone signal and the second microphone signal, the beamform signal forming the first input signal.

In the method, the first suppressor input signal may be selected from the first input signal, the first adder output signal and the processor output signal.

The method may comprise controlling the first delay and/or the first filter, e.g. the first gain. Controlling the first delay and/or the first filter may be based on an input signal from the input module and/or a control signal from the processor. The method may comprise determining the first delay and/or the first filter, e.g. the first gain, e.g. based on an input signal from the input module and/or a control signal from the processor.

FIG. 1 shows an exemplary hearing device. The hearing device 2 comprises an input module 4 for provision of a first input signal 6, the input module comprising a first microphone 8 for provision of a first microphone signal 10. The first microphone signal 10 may be used as the first input signal 6. The input module 4 optionally comprises a second microphone 12 and a first beamformer 14, wherein the first beamformer 14 is connected to the first microphone 8 and the second microphone 12. The first beamformer 14 is configured to provide a beamform signal 16 as the first input signal 6, the first beamform signal 16 being based on first microphone signal 10 and the second microphone signal 18.

The hearing device 2 comprises a processor 20 for processing the first input signal 6 and provision of a processor output signal 22 based on the first input signal 6.

Also, the hearing device 2 comprises a comb suppressor 24 for provision of a first suppressor output signal 26 based on one or more suppressor input signals including a first suppressor input signal 28. The comb suppressor 24 is configured to apply a first delay d_1 and a first filter with a first gain g_1 to at least a part of the first suppressor input signal 28.

The hearing device 2 comprises a first adder 30 connected to the comb suppressor 24. The first adder 30 is configured for provision of a first adder output signal 32 based on at least a part of the processor output signal 22 and the first suppressor output signal 26. The hearing device 2 comprises a receiver 34 for converting an output signal based on the first adder output signal 32 to an audio output signal.

The comb suppressor 24 comprises a primary suppressor part 36, the primary suppressor part 36 having a first primary input connected to the input module 4 for receiving the first input signal 6 as the first suppressor input signal 28. The primary suppressor part 36 is configured to apply a first primary delay as the first delay d_1 and a first primary gain as the first gain g_1 to at least a part of the first suppressor input signal 28. Thereby a first primary output signal is formed based on the first suppressor input signal. In the hearing device 2, the first primary output signal from the primary suppressor part 36 forms the first suppressor output signal 26.

The first gain g_1 is the same as the gain of the acoustic path, e.g. in the range from 0.5 to 1.0.

The first delay d_1 corresponds to twice the delay in the hearing device. The delay in the hearing device comprises hardware delays, e.g. from transducers and D/A converters, and delays related to the hearing device processing.

Figure 2:
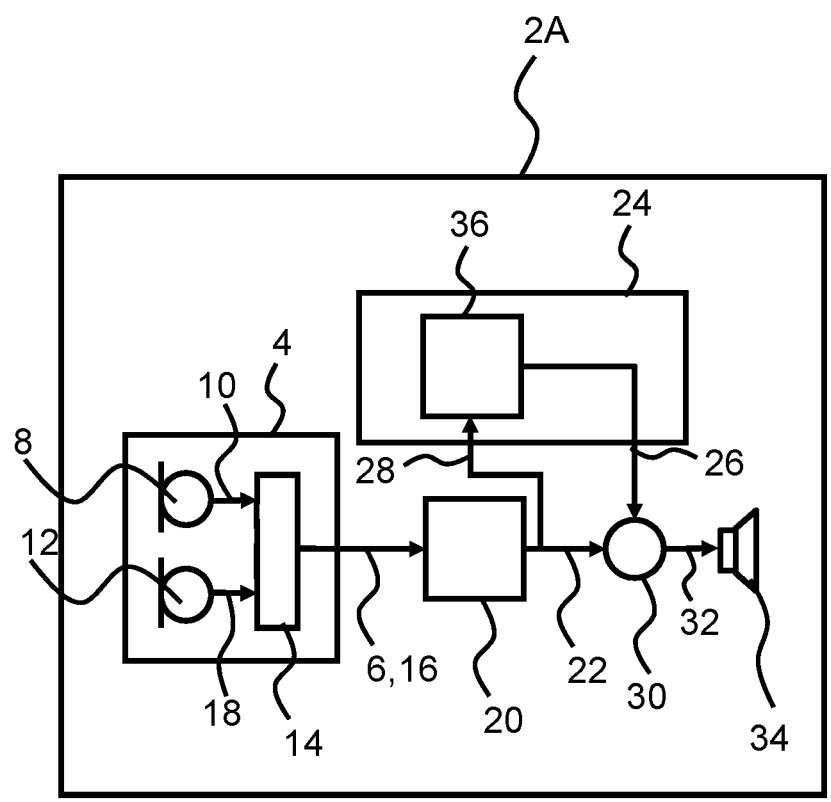
FIG. 2 schematically illustrates an exemplary hearing device.

FIG. 2 shows an exemplary hearing device. The hearing device 2A comprises an input module 4 for provision of a first input signal 6, the input module comprising a first microphone 8 for provision of a first microphone signal 10. The first microphone signal 10 may be used as the first input signal 6. The input module 4 optionally comprises a second microphone 12 and a first beamformer 14, wherein the first beamformer 14 is connected to the first microphone 8 and the second microphone 12. The first beamformer 14 is configured to provide a beamform signal 16 as the first input signal 6, the first beamform signal 16 being based on first microphone signal 10 and the second microphone signal 18.

The hearing device 2A comprises a processor 20 for processing the first input signal 6 and provision of a processor output signal 22 based on the first input signal 6.

Also, the hearing device 2A comprises a comb suppressor 24 for provision of a first suppressor output signal 26 based on one or more suppressor input signals including a first suppressor input signal 28. The comb suppressor 24 is configured to apply a first delay d_1 and a first filter with a first gain g_1 to at least a part of the first suppressor input signal 28.

The hearing device 2A comprises a first adder 30 connected to the comb suppressor 24. The first adder 30 is configured for provision of a first adder output signal 32 based on at least a part of the processor output signal 22 and the first suppressor output signal 26. The hearing device 2A comprises a receiver 34 for converting an output signal based on the first adder output signal 32 to an audio output signal.

The comb suppressor 24 comprises a primary suppressor part 36, the primary suppressor part 36 having a first primary input connected to the processor 20 for receiving the processor output signal 22 as the first suppressor input signal 28. The primary suppressor part 36 is configured to apply a first primary delay as the first delay d_1 and a first primary gain as the first gain g_1 to at least a part of the first suppressor input signal 28. Thereby a first primary output signal is formed based on the first suppressor input signal. In the hearing device 2A, the first primary output signal from the primary suppressor part 36 forms the first suppressor output signal 26.

The first gain g_1 is the difference between the acoustic path and the hearing device path and, i.e. g_1=g_acoustic−$G_{hearing\ device}$. For example, if the hearing device is set to (operates with) a +20 dB gain and the acoustic path provides −6 dB gain, g_1 should be −26 dB.

The first delay d_1 corresponds or is equal to the delay in the hearing device. The delay in the hearing device comprises hardware delays, e.g. from transducers and D/A converters, and delays related to the hearing device processing.

Figure 3:
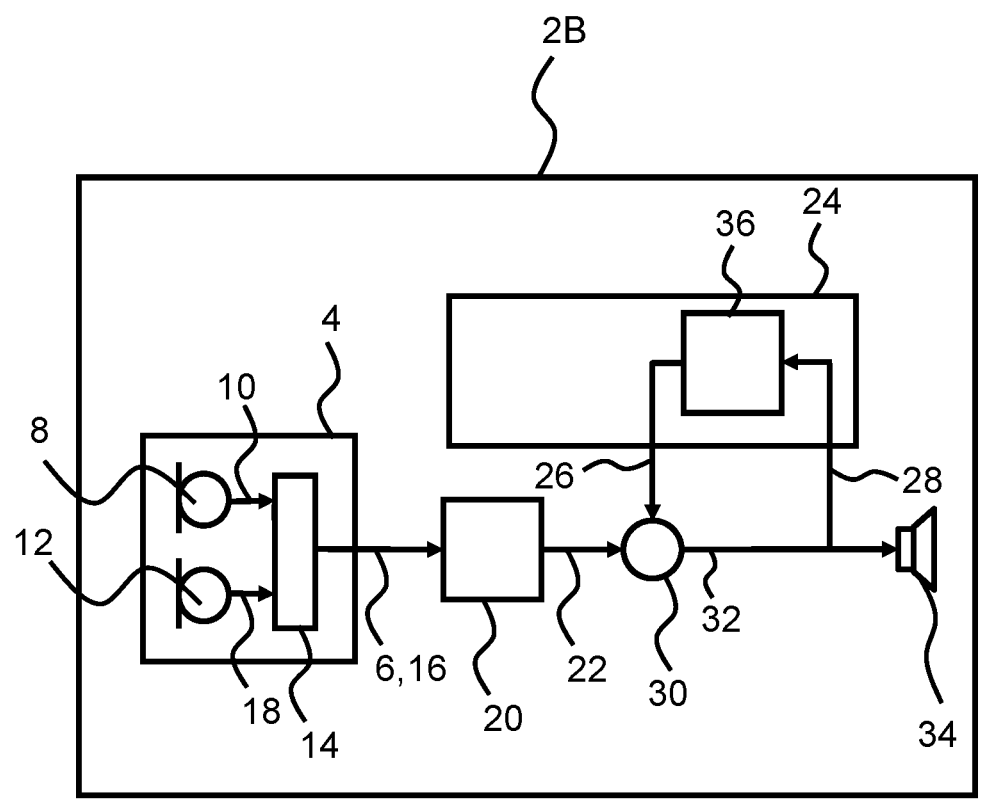
FIG. 3 schematically illustrates an exemplary hearing device.

FIG. 3 shows an exemplary hearing device. The hearing device 2B comprises an input module 4 for provision of a first input signal 6, the input module comprising a first microphone 8 for provision of a first microphone signal 10. The first microphone signal 10 may be used as the first input signal 6. The input module 4 optionally comprises a second microphone 12 and a first beamformer 14, wherein the first beamformer 14 is connected to the first microphone 8 and the second microphone 12. The first beamformer 14 is configured to provide a beamform signal 16 as the first input signal 6, the first beamform signal 16 being based on first microphone signal 10 and the second microphone signal 18.

The hearing device 2B comprises a processor 20 for processing the first input signal 6 and provision of a processor output signal 22 based on the first input signal 6.

Also, the hearing device 2B comprises a comb suppressor 24 for provision of a first suppressor output signal 26 based on one or more suppressor input signals including a first suppressor input signal 28. The comb suppressor 24 is configured to apply a first delay d_1 and a first filter with a first gain g_1 to at least a part of the first suppressor input signal 28.

The hearing device 2B comprises a first adder 30 connected to the comb suppressor 24. The first adder 30 is configured for provision of a first adder output signal 32 based on at least a part of the processor output signal 22 and the first suppressor output signal 26. The hearing device 2B comprises a receiver 34 for converting an output signal based on the first adder output signal 32 to an audio output signal.

The comb suppressor 24 comprises a primary suppressor part 36, the primary suppressor part 36 having a first primary input connected to the first adder 30 for receiving the first adder output signal 32 as the first suppressor input signal 28. The primary suppressor part 36 is configured to apply a first primary delay as the first delay d_1 and a first primary gain as the first gain g_1 to at least a part of the first suppressor input signal 28. Thereby a first primary output signal is formed based on the first suppressor input signal. In the hearing device 2B, the first primary output signal from the primary suppressor part 36 forms the first suppressor output signal 26.

To achieve the goal of reducing the comb filtering effect, the target in hearing device 2B is to make the power spectrum of the total transfer function of the hearing device flat like an all-pass filtering as follows:

$$H(\omega) = \frac{g - e^{-j\omega\tau}}{1 - ge^{-j\omega\tau}}$$

Under the condition gain g<1, we can expand the formula into a series:

$$H(\omega) = g + (g*g - 1)\sum_{n=1}^{\infty} g^{n-1}(\omega)e^{-j\omega n\tau}$$

$$H(\omega)/g = 1 + (g*g - 1)/ge^{-j\omega\tau} + (g*g - 1)/g\sum_{n=2}^{\infty} g^{n-1}(\omega)e^{-j\omega n\tau}$$

In the transfer function formula above, the first item on the right side of the equation represents leakage of the direct sound and the second item for the processed sound. The last item is the generated sound for comb effect suppression from the feedback loop. We represent the right hand side as $H_1(\omega)$:

$$H_1(\omega) = 1 + (g*g - 1)/ge^{-j\omega\tau} + (g*g - 1)/g\sum_{n=2}^{\infty} g^{n-1}(\omega)e^{-j\omega n\tau}$$

$$H(\omega) = H_1(\omega)*g = \frac{g - e^{-j\omega\tau}}{1 - ge^{-j\omega\tau}}$$

If we remove the direct sound component from the $H_1(\omega)$, the remaining components of $H_1(\omega)$ is what need to implement to achieve flat magnitude response. The transfer function of the sound processor is $(g*g-1)/ge^{-j\omega\tau}$ and its gain $$G = \frac{1 - g^2}{g}$$

The total gain of $H_1(\omega)$ is $$\frac{1}{g},$$

i.e. the gain for the hearing device processing. The gain g is the first gain of the comb suppressor. Therefore, the first delay d_1 i.e. τ is equal to the accumulated delay of the signal processors, such as beamforming and sound processor. The first gain g_1 is equal to g. The gain g is optionally less than 1.0 for stability. Therefore, there is some prescribed gain for the hearing aids. For example, a gain of 1 dB for the hearing device is equivalent of g=0.89.

The first gain g_1 may be given as:

$$g\_1 = \frac{-G + \sqrt{G^2 + 4}}{2},$$

where G is the gain of the hearing device or a function of one or more hearing device gains G_1, G_2, . . . .

Figure 4:
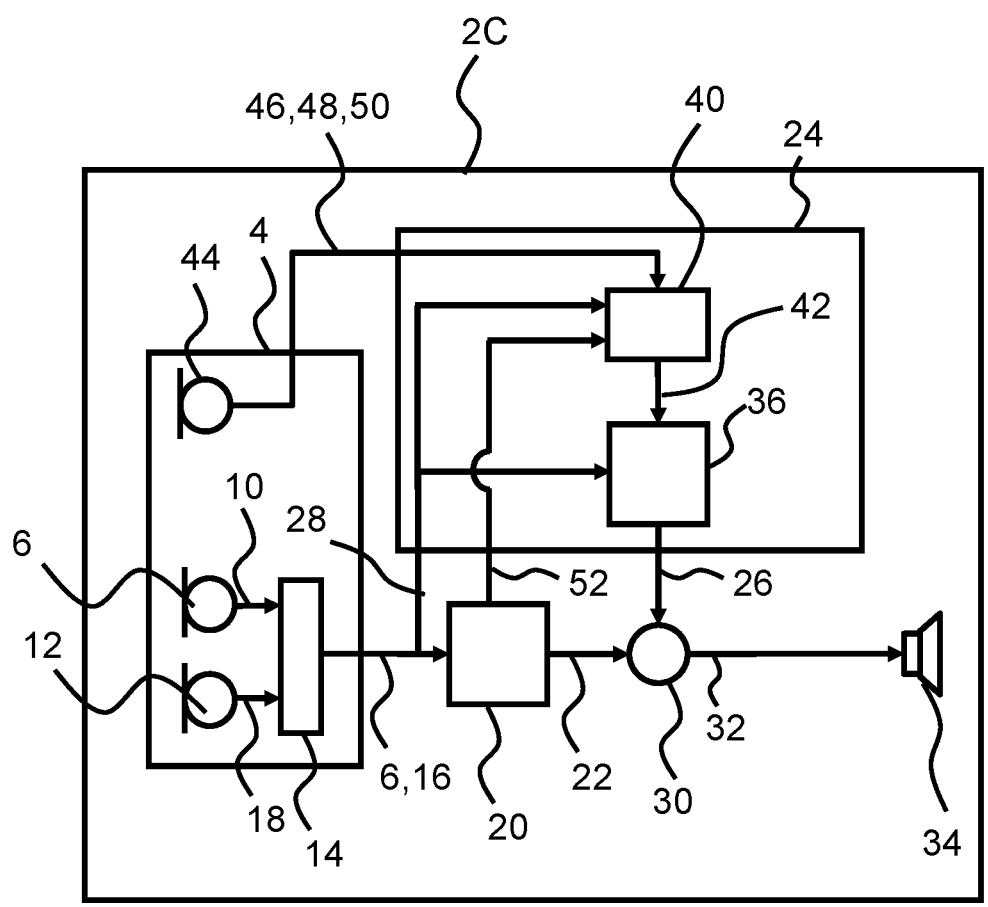
FIG. 4 schematically illustrates an exemplary hearing device.

FIG. 4 shows an exemplary hearing device. The hearing device 2C comprises an input module 4 for provision of a first input signal 6, the input module comprising a first microphone 8 for provision of a first microphone signal 10. The first microphone signal 10 may be used as the first input signal 6. The input module 4 optionally comprises a second microphone 12 and a first beamformer 14, wherein the first beamformer 14 is connected to the first microphone 8 and the second microphone 12. The first beamformer 14 is configured to provide a beamform signal 16 as the first input signal 6, the first beamform signal 16 being based on first microphone signal 10 and the second microphone signal 18.

The hearing device 2C comprises a processor 20 for processing the first input signal 6 and provision of a processor output signal 22 based on the first input signal 6.

Also, the hearing device 2C comprises a comb suppressor 24 for provision of a first suppressor output signal 26 based on one or more suppressor input signals including a first suppressor input signal 28. The comb suppressor 24 is configured to apply a first delay d_1 and a first filter with a first gain g_1 to at least a part of the first suppressor input signal 28.

The hearing device 2C comprises a first adder 30 connected to the comb suppressor 24. The first adder 30 is configured for provision of a first adder output signal 32 based on at least a part of the processor output signal 22 and the first suppressor output signal 26. The hearing device 2C comprises a receiver 34 for converting an output signal based on the first adder output signal 32 to an audio output signal.

The comb suppressor 24 comprises a primary suppressor part 36, the primary suppressor part 36 having a first primary input connected to the input module 4 for receiving the first input signal 6 as the first suppressor input signal 28. The primary suppressor part 36 is configured to apply a first primary delay as the first delay d_1 and a first primary gain as the first gain g_1 to at least a part of the first suppressor input signal 28. Thereby a first primary output signal is formed based on the first suppressor input signal. In the hearing device 2, the first primary output signal from the primary suppressor part 36 forms the first suppressor output signal 26.

The first delay and the first gain d_1 and g_1 are the same as for the hearing device 2B.

The comb suppressor 24 of hearing device 2C comprises a suppressor controller 40 connected to the primary suppressor part 36 and configured to control the first delay d_1 and/or the first filter of the primary suppressor part 36 via control signal 42. In one or more exemplary hearing devices, the first delay is preset, e.g. during manufacture, and the suppressor controller is configured to control the first filter (first gain) of the primary suppressor part. Optionally, as shown in FIG. 4, the first suppressor input signal 28 is fed to the suppressor controller 40 as a controller input signal, and the suppressor controller 40 is configured to control the primary suppressor part 36 based on the first suppressor input signal 28.

In the hearing device 2C, the input module 4 optionally comprises an ear canal microphone 44 for provision of an ear canal input signal 46. The ear canal input signal 46 forms a second input signal 48 from the input module 4. The second input signal 48 is fed to the comb suppressor 24 (suppressor controller 40) as a second suppressor input signal 50. The suppressor controller 40 is configured to control the first delay and/or the first filter based on the second input signal 48 from the input module 4 (second suppressor input signal 50). Thus, the ear canal input signal 46 may form a controller input signal to the suppressor controller 40.

In the hearing device 2C, the processor 20 is connected to the comb suppressor 24 for feeding a control signal 52 from the processor 20 to the comb suppressor 24. Advantageously, the control signal 52 is indicative of one or more processor gains G_1, G_2, ..., G_N applied in the processor 20 (N is the number of frequency bands in the hearing aid processing. Optionally, the suppressor controller 40 is configured to control the first delay and/or the first filter based on the control signal 52 from the processor 20. Thus, the control signal 52 from the processor 20 may form a controller input signal to the suppressor controller 40.

Figure 5:
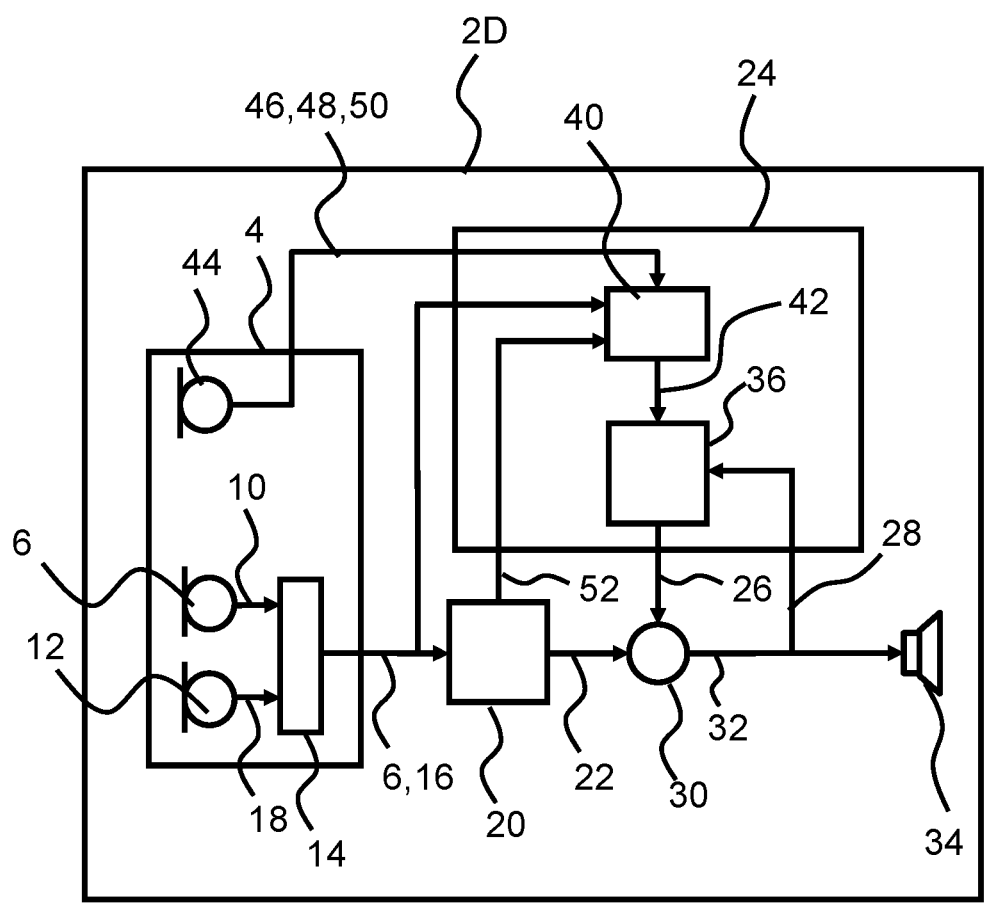
FIG. 5 schematically illustrates an exemplary hearing device.

FIG. 5 shows an exemplary hearing device. The hearing device 2D comprises an input module 4 for provision of a first input signal 6, the input module comprising a first microphone 8 for provision of a first microphone signal 10. The first microphone signal 10 may be used as the first input signal 6. The input module 4 optionally comprises a second microphone 12 and a first beamformer 14, wherein the first beamformer 14 is connected to the first microphone 8 and the second microphone 12. The first beamformer 14 is configured to provide a beamform signal 16 as the first input signal 6, the first beamform signal 16 being based on first microphone signal 10 and the second microphone signal 18.

The hearing device 2D comprises a processor 20 for processing the first input signal 6 and provision of a processor output signal 22 based on the first input signal 6.

Also, the hearing device 2D comprises a comb suppressor 24 for provision of a first suppressor output signal 26 based on one or more suppressor input signals including a first suppressor input signal 28. The comb suppressor 24 is configured to apply a first delay d_1 and a first filter with a first gain g_1 to at least a part of the first suppressor input signal 28.

The hearing device 2D comprises a first adder 30 connected to the comb suppressor 24. The first adder 30 is configured for provision of a first adder output signal 32 based on at least a part of the processor output signal 22 and the first suppressor output signal 26. The hearing device 2D comprises a receiver 34 for converting an output signal based on the first adder output signal 32 to an audio output signal.

The comb suppressor 24 comprises a primary suppressor part 36, the primary suppressor part 36 having a first primary input connected to the first adder 30 for receiving the first adder output signal 32 as the first suppressor input signal 28. The primary suppressor part 36 is configured to apply a first primary delay as the first delay d_1 and a first primary gain as the first gain g_1 to at least a part of the first suppressor input signal 28. Thereby a first primary output signal is formed based on the first suppressor input signal. In the hearing device 2D, the first primary output signal from the primary suppressor part 36 forms the first suppressor output signal 26.

The comb suppressor 24 of hearing device 2D comprises a suppressor controller 40 connected to the primary suppressor part 36 and configured to control the first delay d_1 and/or the first filter of the primary suppressor part 36 via control signal 42. In one or more exemplary hearing devices, the first delay is preset, e.g. during manufacture, and the suppressor controller is configured to control the first filter (first gain) of the primary suppressor part.

In the hearing device 2D, the input module 4 optionally comprises an ear canal microphone 44 for provision of an ear canal input signal 46. The ear canal input signal 46 forms a second input signal 48 from the input module 4. The second input signal 48 is fed to the comb suppressor 24 (suppressor controller 40) as a second suppressor input signal 50. The suppressor controller 40 is configured to control the first delay and/or the first filter based on the second input signal 48 from the input module 4 (second suppressor input signal 50). Thus, the ear canal input signal 46 may form a controller input signal to the suppressor controller 40.

In the hearing device 2D, the processor 20 is connected to the comb suppressor 24 for feeding a control signal 52 from the processor 20 to the comb suppressor 24 as a third suppressor input signal. Advantageously, the control signal 52 is indicative of one or more processor gains G_1, G_2, ..., G_N applied in the processor 20 (N is the number of frequency bands in the hearing aid processing. Optionally, the suppressor controller 40 is configured to control the first delay and/or the first filter based on the control signal 52 from the processor 20. Thus, the control signal 52 from the processor 20 may form a controller input signal to the suppressor controller 40.

Optionally, as shown in FIG. 5, the first input signal 6 from the input module is fed to the suppressor controller 40 as a controller input signal (fourth suppressor input signal to the comb suppressor 24), and the suppressor controller 40 is optionally configured to control the primary suppressor part 36 (first delay and/or first gain) based on the first input signal 6.

Figure 6:
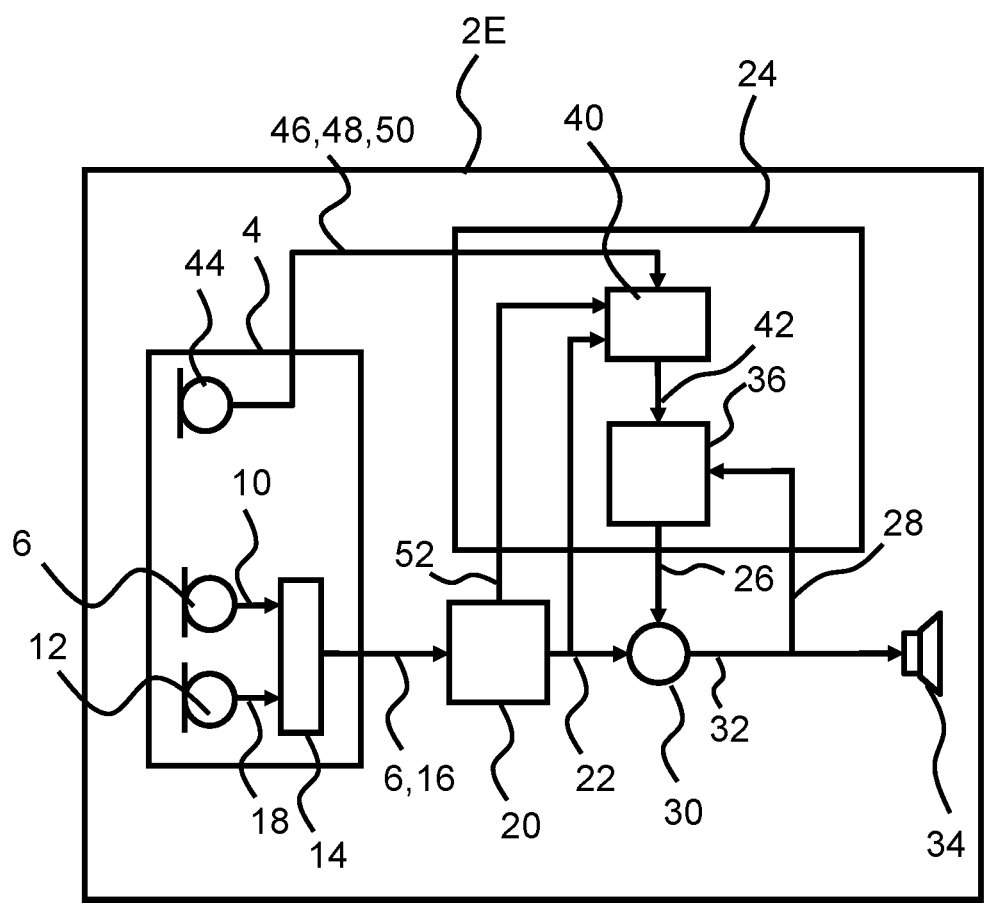
FIG. 6 schematically illustrates an exemplary hearing device.

FIG. 6 shows an exemplary hearing device, where the hearing device 2E uses the processor output signal 22 as a controller input signal in the comb suppressor. The comb suppressor 24 receives the first adder output signal 32 as the first suppressor input signal 28 and comprises a suppressor controller 40 connected to the primary suppressor part 36 and configured to control the first delay d_1 and/or the first filter of the primary suppressor part 36 via control signal 42. In one or more exemplary hearing devices, the first delay is preset, e.g. during manufacture, and the suppressor controller is configured to control the first filter (first gain) of the primary suppressor part.

In the hearing device 2E, the input module 4 optionally comprises an ear canal microphone 44 for provision of an ear canal input signal 46. The ear canal input signal 46 forms a second input signal 48 from the input module 4. The second input signal 48 is fed to the comb suppressor 24 (suppressor controller 40) as a second suppressor input signal 50. The suppressor controller 40 is configured to control the first delay and/or the first filter based on the second input signal 48 from the input module 4 (second suppressor input signal 50). Thus, the ear canal input signal 46 may form a controller input signal to the suppressor controller 40.

In the hearing device 2E, the processor 20 is connected to the comb suppressor 24 for feeding a control signal 52 from the processor 20 to the comb suppressor 24 as a third suppressor input signal. Advantageously, the control signal 52 is indicative of one or more processor gains G_1, G_2, ..., G_N applied in the processor 20 (N is the number of frequency bands in the hearing aid processing. Optionally, the suppressor controller 40 is configured to control the first delay and/or the first filter based on the control signal 52 from the processor 20. Thus, the control signal 52 from the processor 20 may form a controller input signal to the suppressor controller 40.

Optionally, as shown in FIG. 6, the processor output signal 22 from processor 20 is fed to the suppressor controller 40 as a controller input signal (fourth suppressor input signal to the comb suppressor 24), and the suppressor controller 40 is optionally configured to control the primary suppressor part 36 (first delay and/or first gain) based on the processor output signal 22.

Figure 7:
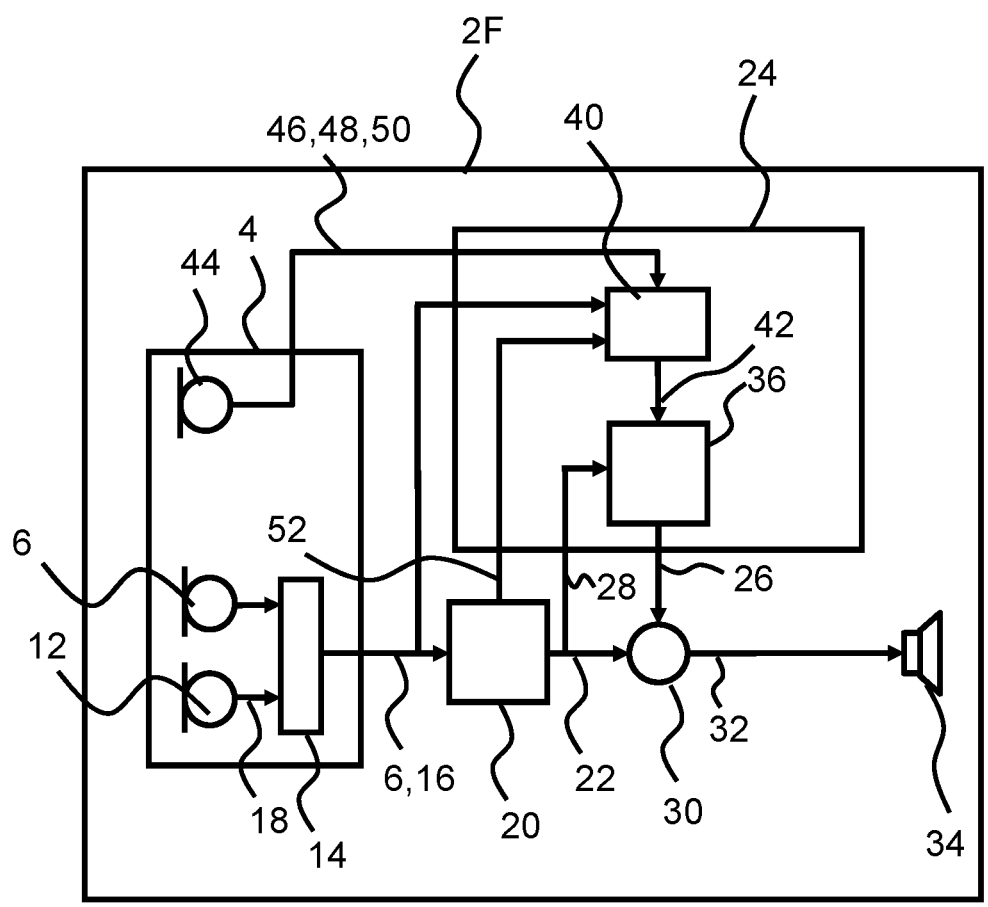
FIG. 7 schematically illustrates an exemplary hearing device.

FIG. 7 shows an exemplary hearing device, where the hearing device 2F uses the control signal 52 and the first input signal 6 as controller input signals in the comb suppressor 24. The comb suppressor 24 receives the processor output signal 22 as the first suppressor input signal 28 and comprises a suppressor controller 40 connected to the primary suppressor part 36 and configured to control the first delay d_1 and/or the first filter of the primary suppressor part 36 via control signal 42. In one or more exemplary hearing devices, the first delay is preset, e.g. during manufacture, and the suppressor controller is configured to control the first filter (first gain) of the primary suppressor part.

In the hearing device 2F, the input module 4 optionally comprises an ear canal microphone 44 for provision of an ear canal input signal 46. The ear canal input signal 46 forms a second input signal 48 from the input module 4. The second input signal 48 is fed to the comb suppressor 24 (suppressor controller 40) as a second suppressor input signal 50. The suppressor controller 40 is configured to control the first delay and/or the first filter based on the second input signal 48 from the input module 4 (second suppressor input signal 50). Thus, the ear canal input signal 46 may form a controller input signal to the suppressor controller 40.

In the hearing device 2F, the processor 20 is connected to the comb suppressor 24 for feeding a control signal 52 from the processor 20 to the comb suppressor 24 as a third suppressor input signal. Advantageously, the control signal 52 is indicative of one or more processor gains G_1, G_2, . . . , G_N applied in the processor 20 (N is the number of frequency bands in the hearing aid processing. Optionally, the suppressor controller 40 is configured to control the first delay and/or the first filter based on the control signal 52 from the processor 20. Thus, the control signal 52 from the processor 20 may form a controller input signal to the suppressor controller 40.

Optionally, as shown in FIG. 7, the first input signal 6 from input module 4 is fed to the suppressor controller 40 as a controller input signal (fourth suppressor input signal to the comb suppressor 24), and the suppressor controller 40 is optionally configured to control the primary suppressor part 36 (first delay and/or first gain) based on the first input signal 6.

Figure 8:
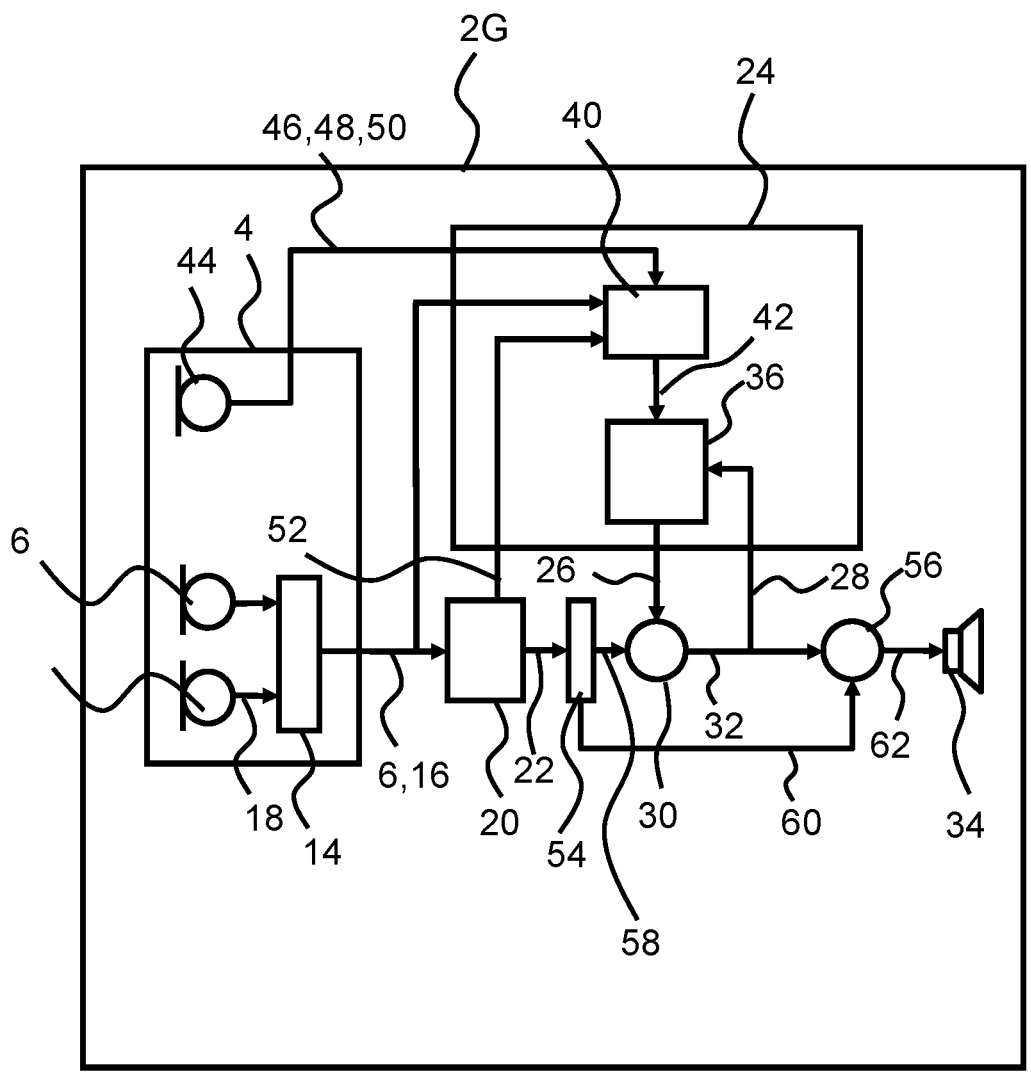
FIG. 8 schematically illustrates an exemplary hearing device.

FIG. 8 shows an exemplary hearing device, where the hearing device 2G comprises a filter bank 54 and a second adder 56. The filter bank 54 has an input connected to the processor 20 for receiving and filtering the processor output signal 22 into at least a first filter output signal 58 and a second filter output signal 60, wherein the first filter output signal 58 is fed to the first adder 30 and the second filter output signal 60 is fed to the second adder 56 together with the first adder output signal 32. The second adder 56 is connected to the receiver 34 for provision of a second adder output signal 62 to the receiver. The first filter output signal 58 is a low-pass signal, e.g. with a cutoff frequency in the range from 500 Hz to 1500 Hz. The second filter output signal 60 is a high-pass signal, e.g. with a cutoff frequency equal to the low pass filter.

The comb suppressor 24 receives the first adder output signal 32 as the first suppressor input signal 28 and comprises a suppressor controller 40 connected to the primary suppressor part 36 and configured to control the first delay d_1 and/or the first filter of the primary suppressor part 36 via control signal 42. In one or more exemplary hearing devices, the first delay is preset, e.g. during manufacture, and the suppressor controller is configured to control the first filter (first gain) of the primary suppressor part.

In the hearing device 2G, the input module 4 optionally comprises an ear canal microphone 44 for provision of an ear canal input signal 46. The ear canal input signal 46 forms a second input signal 48 from the input module 4. The second input signal 48 is fed to the comb suppressor 24 (suppressor controller 40) as a second suppressor input signal 50. The suppressor controller 40 is configured to control the first delay and/or the first filter based on the second input signal 48 from the input module 4 (second suppressor input signal 50). Thus, the ear canal input signal 46 may form a controller input signal to the suppressor controller 40.

In the hearing device 2G, the processor 20 is connected to the comb suppressor 24 for feeding a control signal 52 from the processor 20 to the comb suppressor 24 as a third suppressor input signal. Advantageously, the control signal 52 is indicative of one or more processor gains G_1, G_2, . . . , G_N applied in the processor 20 (N is the number of frequency bands in the hearing aid processing. Optionally, the suppressor controller 40 is configured to control the first delay and/or the first filter based on the control signal 52 from the processor 20. Thus, the control signal 52 from the processor 20 may form a controller input signal to the suppressor controller 40.

Optionally, as shown in FIG. 8, the first input signal 6 from input module 4 is fed to the suppressor controller 40 as a controller input signal (fourth suppressor input signal to the comb suppressor 24), and the suppressor controller 40 is optionally configured to control the primary suppressor part 36 (first delay and/or first gain) based on the first input signal 6.

The suppressor controller 40, e.g. in one or more of the hearing devices 2, 2A, 2B, 2C, 2D, 2E, 2F, 2G, may be configured to determine a suppressor mode and apply a first suppressor scheme in the primary suppressor part if the suppressor mode is a first suppressor mode and a second suppressor scheme in the primary suppressor part if the suppressor mode is a second suppressor mode.

Figure 9:
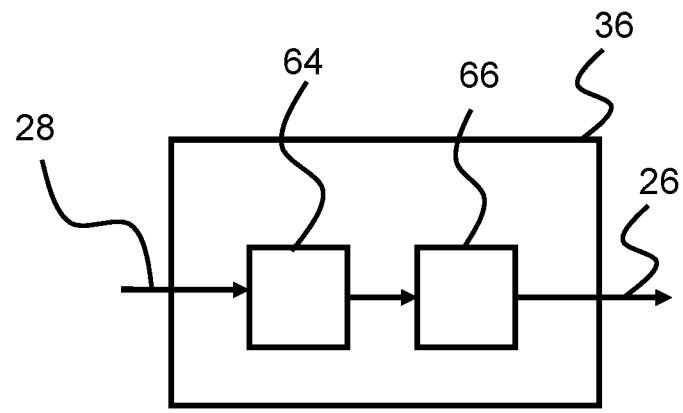
FIG. 9 schematically illustrates an exemplary primary suppressor part.

FIG. 9 illustrates an exemplary primary suppressor part 36, e.g. of hearing devices 2, 2A, 2B. The primary suppressor part 36 comprises a first delay unit 64 and a first gain unit 66. The first delay unit 64 applies a first primary delay as first delay d_1 to the first suppressor input signal 28. Subsequently, the first gain unit 66 applies a first primary gain as the first gain g_1 to the delayed first suppressor input signal. The output of the first gain unit 66 forms the first suppressor output signal 26.

In one or more exemplary hearing devices, such as hearing device 2 shown in FIG. 1, the first primary delay is about twice the delay in the hearing device, e.g. in the range from 4 ms to 20 ms, and/or the first primary gain is in the range from −1.5 to −0.2, e.g. in the range from −1.1 to −0.5.

In one or more exemplary hearing devices, such as hearing device 2A shown in FIG. 2, the first primary delay is about the same as the delay in the hearing device, e.g. in the range from 2 ms to 10 ms, and/or the first primary gain is in the range from −1.5 to −0.2, e.g. in the range from −1.1 to −0.5.

In one or more hearing devices, the delay in the hearing device is in the range from 0.5 ms to 2 ms, such as in the range from 1 ms to 2 ms. In one or more hearing devices, the delay in the hearing device is in the range from 2 ms to 10 ms.

In one or more exemplary hearing devices, such as hearing device 2B shown in FIG. 3, the first primary delay is about the same as the delay in the processor and the beamforming processing, e.g. in the range from 2 ms to 10 ms, and/or the first primary gain is may be given as $$\_1 = \frac{-G + \sqrt{G^2 + 4}}{2},$$

where G is the gain of the hearing device or a function of one or more hearing device gains G_1, G_2, .... Thus, the first gain may be given as a function of one or more hearing device gains.

Figure 10:
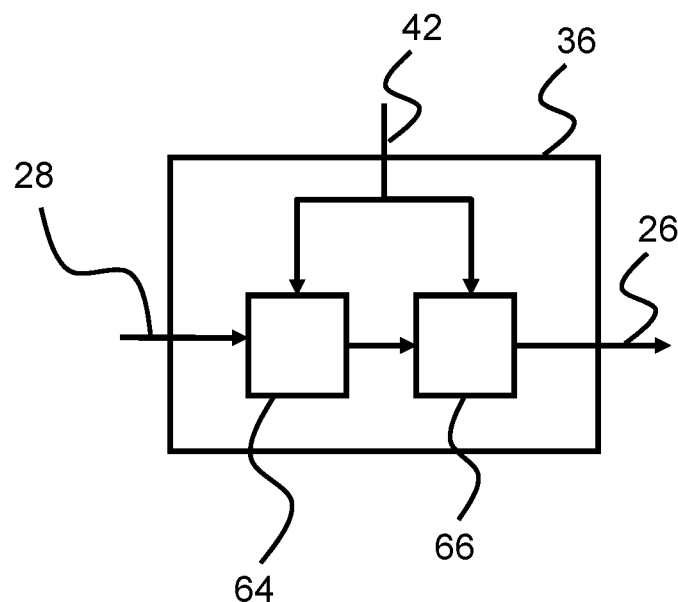
FIG. 10 schematically illustrates an exemplary primary suppressor part.

FIG. 10 illustrates an exemplary primary suppressor part 36, e.g. of hearing devices 2C, 2D, 2E, 2F, 2G. The primary suppressor part 36 comprises a first delay unit 64 and a first gain unit 66. The first delay unit 64 applies a first primary delay as first delay d_1 to the first suppressor input signal 28. Subsequently, the first gain unit 66 applies a first primary gain as the first gain g_1 to the delayed first suppressor input signal. The output of the first gain unit 66 forms the first suppressor output signal 26. The first delay unit 64/first delay d_1 and/or the first gain unit 66/first gain g_1 are controlled by control signal 42 from the suppressor controller.

Figure 11:
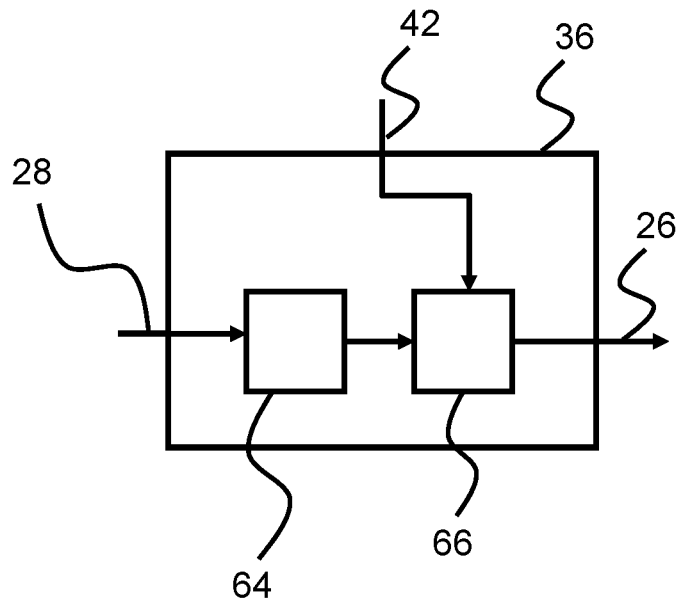
FIG. 11 schematically illustrates an exemplary primary suppressor part.

FIG. 11 illustrates an exemplary primary suppressor part 36, e.g. of hearing devices 2C, 2D, 2E, 2F, 2G. The primary suppressor part 36 comprises a first delay unit 64 and a first gain unit 66. The first delay unit 64 applies a first primary delay as first delay d_1 to the first suppressor input signal 28. Subsequently, the first gain unit 66 applies a first primary gain as the first gain g_1 to the delayed first suppressor input signal. The output of the first gain unit 66 forms the first suppressor output signal 26. The first gain unit 66/first gain g_1 is controlled by control signal 42 from the suppressor controller.

Figure 12:
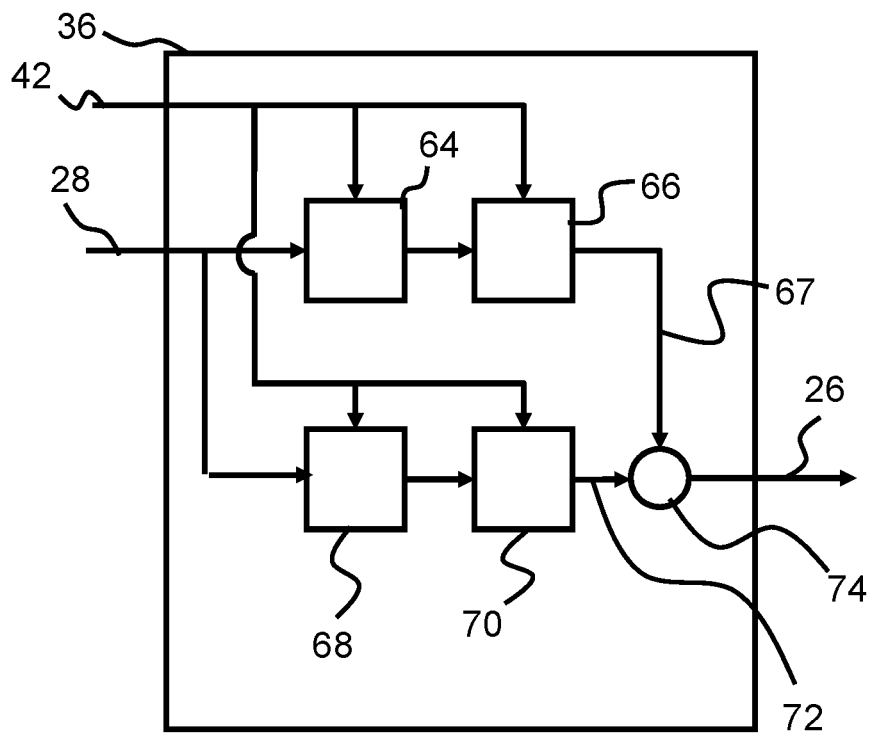
FIG. 12 schematically illustrates an exemplary primary suppressor part.

FIG. 12 illustrates an exemplary primary suppressor part 36, e.g. of hearing devices 2C, 2D, 2E, 2F, 2G. The primary suppressor part 36 comprises a first delay unit 64 and a first gain unit 66. The first delay unit 64 applies a first primary delay as first delay d_1 to the first suppressor input signal 28. Subsequently, the first gain unit 66 applies a first primary gain as the first gain g_1 to the delayed first suppressor input signal. The output of the first gain unit 66 forms a first primary output signal 67. The first delay unit 64/first delay d_1 and/or the first gain unit 66/first gain g_1 are optionally controlled by control signal 42 from the suppressor controller. The primary suppressor part 36 comprises a second delay unit 68 and a second gain unit 70. The second delay unit 68 applies a second primary delay to at least a part of the first suppressor input signal 28. Subsequently, the second gain unit 70 applies a second primary gain/second primary filter to the delayed first suppressor input signal from the second delay unit 68. The output of the second gain unit 70 forms a second primary output signal 72. The first primary output signal 67, and the second primary output signal 72 are added in suppressor adder 74 to form the first suppressor output signal 26. It is to be understood that any suitable number of delay units/gain units may be implemented in the primary processor part. The second delay unit 68/second delay and/or the second gain unit 70/second gain are optionally controlled by control signal 42 from the suppressor controller.

Figure 13:
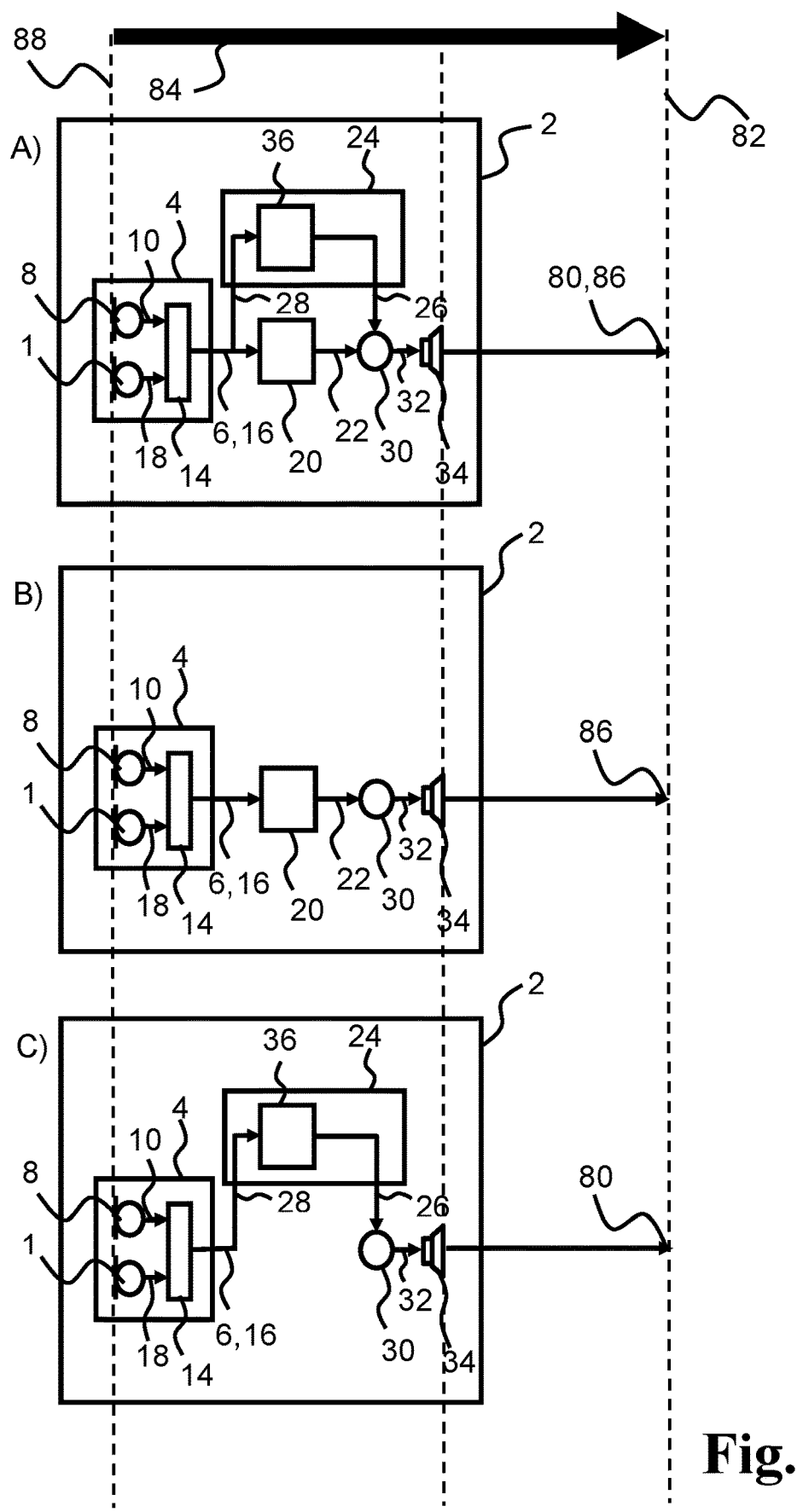
FIG. 13 illustrates the principle behind the comb effect suppression.

FIG. 13 illustrates the comb suppression of hearing device 2, where FIG. 13 B) shows the processing part of the hearing device 2 and FIG. 13 C) shows the comb suppression part of hearing device 2. The gain (optionally frequency dependent) applied in the primary suppressor part 36 should be chosen such that the sound pressure 80 generated by the first suppressor output signal 26 at the ear drum 82 equals the magnitude of the direct sound 84 at the ear drum 82. The processor output signal 22 generates a sound pressure 86 at the ear drum 82.

The direct sound 84 is frequency amplified (and/or attenuated) by the ear canal and any obstacle in the path. This amplification between the sound pickup 88 and the eardrum 82 is also denoted $g_{Direct}(\omega)$ and phase of the direct sound component is denoted $\alpha_{Direct}=0$.

The processing of the signal between sound pickup with microphones 8,12 to sound generation with receiver 34 adds a processing delay, which is described by $\Delta\varphi_{Delay}(\omega)$ relative to the phase of the direct sound. This delay can be frequency dependent. The phase shift between receiver 34 and ear drum 82 can be neglected due to ear channel dimensions/length much shorter than wavelength.

Thus, for the processing part in FIG. 13 B), $g_{Processed}=g_{Direct+\Delta}g_{Delay}(\omega)$ and $g_{Processed}(\omega)$ For the comb suppression part in FIG. 13 C), the first suppressor input signal 28 should be delayed by twice the processing delay of the hearing device. The signal has been matched to the direct sound 84 by applying a filter, which matches the magnitude of the compensating signal to the direct sound signal. Additionally, the signal should be inverted.

Thus $g_{comb\ suppressor}(\omega)=-g_{Direct}(\omega)$, where $g_{comb\ suppressor}(\omega)$ is the frequency-dependent gain in the primary suppressor part 36. In relation to FIG. 13, all stated gains are in amplitude and not in dB scale. Further, in relation to FIG. 13, all gains and phases are defined as the relation of the signal picked up by the ear drum 82 to the signal at sound pickup 88.

The use of the terms "first", "second", "third" and "fourth", etc. does not imply any order, but are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2, 2A, 2B, 2C, 2D, 2E, 2F, 2G hearing device
4 input module
6 first input signal
8 first microphone
10 first microphone signal
12 second microphone
14 first beamformer
16 beamform signal
18 second microphone signal
20 processor
22 processor output signal 24 comb suppressor
26 first suppressor output signal
28 first suppressor input signal
30 first adder
32 first adder output signal
34 receiver
36 primary suppressor part
40 suppressor controller
42 control signal
44 ear canal microphone
46 ear canal input signal
48 second input signal
50 second suppressor input signal
52 control signal from processor
54 filter bank
56 second adder
58 first filter output signal
60 second filter output signal
62 second adder output signal
64 first delay unit
66 first gain unit
67 first primary output signal
68 second delay unit
70 second gain unit
72 second primary output signal
74 suppressor adder
80 sound pressure generated by first suppressor output signal
82 ear drum
84 direct sound
86 sound pressure generated by the processor output signal
88 sound pickup

The invention claimed is:

1. A hearing device comprising:
an input module for provision of a first input signal, the input module comprising a first microphone;
a processor for provision of a processor output signal based on the first input signal;
a comb suppressor for provision of a first suppressor output signal based on one or more suppressor input signals including a first suppressor input signal;
a first adder coupled to the comb suppressor, the first adder configured for provision of a first adder output signal based on at least a part of the processor output signal and the first suppressor output signal; and
a receiver for converting an output signal based on the first adder output signal to an audio output signal;
wherein the comb suppressor is configured to apply a first delay and a first filter with a first gain to at least a part of the first suppressor input signal.

2. The hearing device according to claim 1, wherein the comb suppressor comprises a primary suppressor part, the primary suppressor part having a first primary input connected to the input module for receiving the first suppressor input signal, the primary suppressor part configured to apply a first primary delay as the first delay and a first primary gain as the first gain to at least a part of the first suppressor input signal to form a first primary output signal, wherein the first primary output signal forms at least a part of the first suppressor output signal.

3. The hearing device according to claim 2, wherein the comb suppressor comprises a suppressor controller, and wherein the suppressor controller is configured to control the primary suppressor part based on the first input signal.

4. The hearing device according to claim 3, wherein the suppressor controller is configured to control the first delay and the first filter.

5. The hearing device according to claim 4, wherein the input module comprises an ear canal microphone for provision of an ear canal input signal, and wherein the suppressor controller is configured to control the first delay and the first filter based on a second input signal from the input module, the ear canal input signal being the second input signal.

6. The hearing device according to claim 2, wherein the primary suppressor part is configured to apply a second primary delay and a second primary filter to at least a part of the first suppressor input signal to form a second primary output signal, wherein the second primary output signal forms at least a part of the first suppressor output signal.

7. The hearing device according to claim 2, wherein the comb suppressor comprises a suppressor controller configured to control the first delay and the first filter.

8. The hearing device according to claim 2, wherein the comb suppressor comprises a suppressor controller, and wherein the suppressor controller is configured to determine a suppressor mode and apply a first suppressor scheme if the suppressor mode is a first suppressor mode and a second suppressor scheme if the suppressor mode is a second suppressor mode.

9. The hearing device according to claim 2, wherein the input module comprises a second microphone and a first beamformer, wherein the first beamformer is connected to the first microphone and the second microphone and is configured to provide a beamform signal based on first and second microphone signals as the first input signal.

10. The hearing device according to claim 2, wherein the hearing device comprises a filter bank and a second adder, the filter bank connected to the processor for filtering the processor output signal into at least a first filter output signal and a second filter output signal;
wherein the first adder is configured to receive the first filter output signal, and the second adder is configured to receive the second filter output signal and the first adder output signal; and wherein the second adder is coupled to the receiver for provision of a second adder output signal to the receiver.

11. The hearing device according to claim 1, wherein the comb suppressor comprises a primary suppressor part, the primary suppressor part having a first primary input connected to the processor for receiving the first suppressor input signal, the primary suppressor part configured to apply a first primary delay as the first delay and a first primary gain as the first gain to at least a part of the first suppressor input signal to form a first primary output signal, wherein the first primary output signal forms at least a part of the first suppressor output signal.

12. The hearing device according to claim 11, wherein the comb suppressor comprises a suppressor controller configured to control the first delay and the first filter.

13. The hearing device according to claim 11, wherein the comb suppressor comprises a suppressor controller, and wherein the suppressor controller is configured to control the primary suppressor part based on the first input signal.

14. The hearing device according to claim 11, wherein the comb suppressor comprises a suppressor controller, and wherein the suppressor controller is configured to determine a suppressor mode and apply a first suppressor scheme if the suppressor mode is a first suppressor mode and a second suppressor scheme if the suppressor mode is a second suppressor mode.

15. The hearing device according to claim 11, wherein the primary suppressor part is configured to apply a second primary delay and a second primary filter to at least a part of the first suppressor input signal to form a second primary output signal, wherein the second primary output signal forms at least a part of the first suppressor output signal.

16. The hearing device according to claim 11, wherein the input module comprises a second microphone and a first beamformer, wherein the first beamformer is connected to the first microphone and the second microphone and is configured to provide a beamform signal based on first and second microphone signals as the first input signal.

17. The hearing device according to claim 11, wherein the hearing device comprises a filter bank and a second adder, the filter bank connected to the processor for filtering the processor output signal into at least a first filter output signal and a second filter output signal;
wherein the first adder is configured to receive the first filter output signal, and the second adder is configured to receive the second filter output signal and the first adder output signal; and
wherein the second adder is coupled to the receiver for provision of a second adder output signal to the receiver.

18. The hearing device according to claim 1, wherein the comb suppressor comprises a primary suppressor part, the primary suppressor part having a first primary input connected to an output of the first adder for receiving the first adder output signal as the first suppressor input signal, the primary suppressor part configured to apply a first primary delay as the first delay and a first primary gain as the first gain to at least a part of the first suppressor input signal to form a first primary output signal, wherein the first primary output signal forms at least a part of the first suppressor output signal.

19. The hearing device according to claim 18, wherein the comb suppressor comprises a suppressor controller configured to control the first delay and the first filter.

20. The hearing device according to claim 18, wherein the comb suppressor comprises a suppressor controller, and wherein the suppressor controller is configured to control the primary suppressor part based on the first input signal.

21. The hearing device according to claim 18, wherein the comb suppressor comprises a suppressor controller, and wherein the suppressor controller is configured to determine a suppressor mode and apply a first suppressor scheme if the suppressor mode is a first suppressor mode and a second suppressor scheme if the suppressor mode is a second suppressor mode.

22. The hearing device according to claim 18, wherein the primary suppressor part is configured to apply a second primary delay and a second primary filter to at least a part of the first suppressor input signal to form a second primary output signal, wherein the second primary output signal forms at least a part of the first suppressor output signal.

23. The hearing device according to claim 18, wherein the input module comprises a second microphone and a first beamformer, wherein the first beamformer is connected to the first microphone and the second microphone and is configured to provide a beamform signal based on first and second microphone signals as the first input signal.

24. The hearing device according to claim 18, wherein the hearing device comprises a filter bank and a second adder, the filter bank connected to the processor for filtering the processor output signal into at least a first filter output signal and a second filter output signal;
wherein the first adder is configured to receive the first filter output signal, and the second adder is configured to receive the second filter output signal and the first adder output signal; and
wherein the second adder is coupled to the receiver for provision of a second adder output signal to the receiver.

25. The hearing device according to claim 1, wherein the comb suppressor comprises a suppressor controller configured to control the first delay and the first filter.

26. The hearing device according to claim 25, wherein the suppressor controller is configured to control the first delay and the first filter based on a control signal from the processor.

27. The hearing device according to claim 1, wherein the comb suppressor comprises a suppressor controller, and wherein the suppressor controller is configured to determine a suppressor mode and apply a first suppressor scheme if the suppressor mode is a first suppressor mode and a second suppressor scheme if the suppressor mode is a second suppressor mode.

28. The hearing device according to claim 1, wherein the input module comprises a second microphone and a first beamformer, wherein the first beamformer is connected to the first microphone and the second microphone and is configured to provide a beamform signal based on first and second microphone signals as the first input signal.

29. The hearing device according to claim 1, wherein the hearing device comprises a filter bank and a second adder, the filter bank connected to the processor for filtering the processor output signal into at least a first filter output signal and a second filter output signal;
wherein the first adder is configured to receive the first filter output signal, and the second adder is configured to receive the second filter output signal and the first adder output signal; and
wherein the second adder is coupled to the receiver for provision of a second adder output signal to the receiver.

30. A method of operating a hearing device comprising an input module and a processor, the method comprising:
converting an audio input to a first input signal;
providing a processor output signal based on the first input signal;
providing a first suppressor output signal based on one or more suppressor input signals including a first suppressor input signal, wherein the act of providing the first suppressor output signal comprises applying a first delay and a first filter with a first gain to at least a part of the first suppressor input signal;
providing a first adder output signal based on at least a part of the processor output signal and the first suppressor output signal; and
converting an output signal based on the first adder output signal to an audio signal.

31. The method according to claim 30, wherein the first suppressor input signal comprises the first input signal, the first adder output signal, or the processor output signal.

32. The method according to claim 30, further comprising controlling the first delay and the first filter based on an input signal from the input module or based on a control signal from the processor.

33. The method according to claim 30, further comprising controlling the first delay and the first filter based on an input signal from the input module, and based on a control signal from the processor.

34. The method according to claim 30, wherein the first suppressor input signal is based on the first input signal, the first adder output signal, or the processor output signal.

35. A hearing device comprising:
- an input module for provision of a first input signal, the input module comprising a first microphone;
- a processor for provision of a processor output signal based on the first input signal;
- a suppressor for provision of a first suppressor output signal based on one or more suppressor input signals including a first suppressor input signal;
- a first adder coupled to the suppressor, the first adder configured for provision of a first adder output signal based on at least a part of the processor output signal and the first suppressor output signal; and
- a receiver for converting an output signal based on the first adder output signal to an audio output signal;
- wherein the suppressor is configured to apply a first delay and a first filter with a first gain to at least a part of the first suppressor input signal.

36. The hearing device according to claim 35, wherein the suppressor comprises a comb suppressor.

* * * * *